July 13, 1954  G. ANDERSON  2,683,619
CAR DOOR OPERATING MEANS
Filed Feb. 21, 1952  2 Sheets-Sheet 1
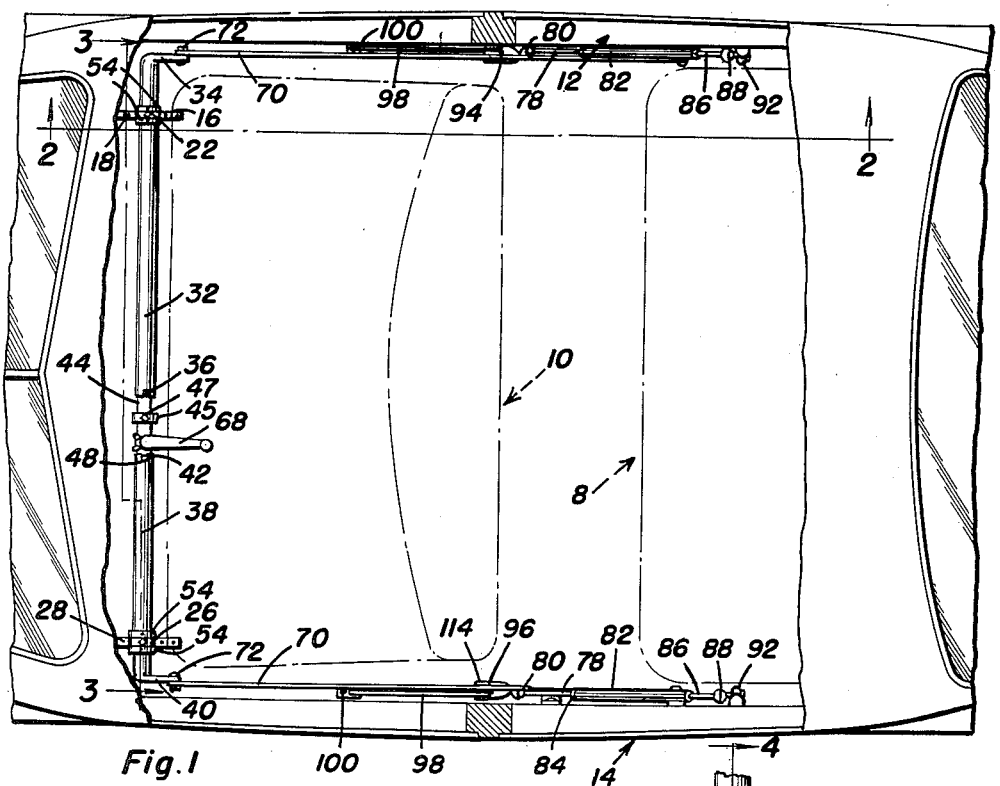
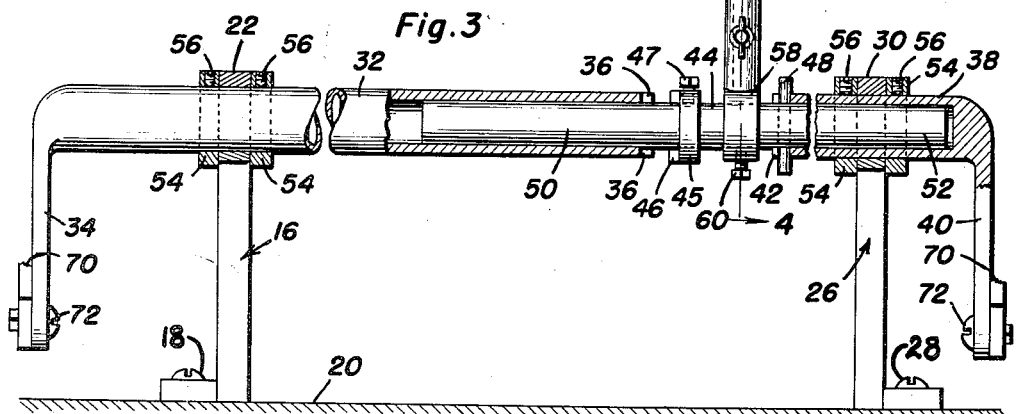
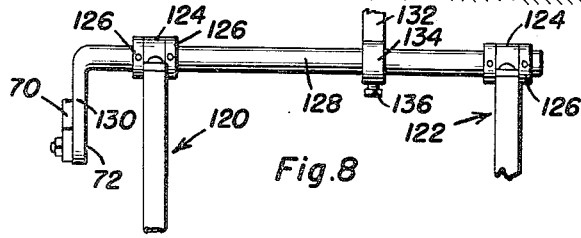
George Anderson
INVENTOR.

July 13, 1954

G. ANDERSON 2,683,619

CAR DOOR OPERATING MEANS

Filed Feb. 21, 1952

George Anderson
*INVENTOR.*

BY *Clarence A. O'Brien
and Harvey B. Jacobson*
*Attorneys*

Patented July 13, 1954

2,683,619

UNITED STATES PATENT OFFICE 2,683,619

CAR DOOR OPERATING MEANS

George Anderson, Walla Walla, Wash.

Application February 21, 1952, Serial No. 272,795

4 Claims. (Cl. 296—44)

1

The present invention relates to remote-controlled, manually actuatable mechanical means for both opening and closing rear, forwardly opening doors in motor vehicles and has more particular reference to means which is especially, but not necessarily, adapted to be installed in a taxicab or any similar public serving vehicle wherein it is the generally recognized duty of the driver, a chauffeur, for example, to cordially assist passengers in alighting from or entering the vehicle, as the case may be.

As the preceding introduction implies, many and varied styles and forms of door openers and closers have been contrived by others. Since, however, prior art constructions have not, apparently, been widely adopted and used, it is to be assumed that a chief reason is that they do not satisfactorily meet the requirements of manufacturers and users. Therefore, it is the obvious purpose of the instant endeavor to provide the trade with novel, practical and reliable car door operating means which, it is believed, is in keeping with ordinary requirements in that it will accomplish the over-all end results desired.

Another object of the invention is to provide car door operating means wherein the driver of the car may expeditiously and conveniently open and close either the right or left rear door, this through the aid and medium of practical easy-to-operate clutch means cooperating with the manually actuable controller lever.

It is also an object of the invention to provide a construction which lends itself to use in operating either one door or two doors without materially changing or altering the basic principle of construction.

More specifically, the invention appertains to a single door construction for use in a motor vehicle having a vertical side with a rear entrance and exit opening, an outwardly and forwardly swinging hinged door and a latch operating handle rearwardly swingable on the interior side of said door; a remote-controlled, mechanical, manually actuable device for first operating said latch-handle and secondly swinging said door open comprising, a rock shaft, bearing means in which said shaft is supported for forward and rearward rocking motions, self-adjusting push-pull operating linkage means adjustably pivoted at its leading end on said rock shaft and adapted to be operatively connected at its trailing end to said handle, fixture means rigidly attachable to the lower interior side of said door in a horizontal plane below said handle, and a thrust motion lever connected at an angle to said fixture

2 means, and a delayed action operating connection between said lever and said linkage means.

In addition to the clutch arrangement already alluded to, novelty is predicated on a vehicle door, a horizontal bar, brackets securing said bar to a lower interior portion of said door, one end of said bar being twisted and projecting toward and beyond the hinged edge of said door, a complemental lever having ball and socket connection at its lower end with said twisted end, a support-brace having means at its lower end whereby it may be securely anchored, means pivotally and adjustably connecting the upper end of said brace to the upper end of said lever, and operating means for said lever.

Then, too, novelty has to do with a vehicle door having an interior latch handle, a push-pull link, remote control means for imparting lengthwise movement to the leading end of said link, a first rod having flexible operating connection with the trailing end of said link, a tubular coupling, a second rod, said rods having their adjacent ends fitting telescopically and slidingly in the respective end portions of said coupling, and ball and socket jointing means on the rearward end of said second rod and operatively joined with said latch-handle.

Other objects, features and advantages will become more readily apparent from the following description and the accompanying sheet of illustrative drawings.

In the accompanying drawings, wherein like numerals are employed to designate like parts throughout the views:

Figure 1 is a top plan view showing a fragmentary portion of an automobile with forwardly swinging right and left rear doors and showing the dual-type remote-control and operating means for the doors constructed in accordance with the principles of the present invention.

Figure 3 is a view at right angles to Figure 2 wherein the section is taken on the plane of the line 3—3 of Figure 1, also looking in the direction of the arrows.

Figure 8 is a fragmentary elevational view showing a modification wherein the rock shaft is arranged for single door operation, the right-hand door, for example.

Figure 4:
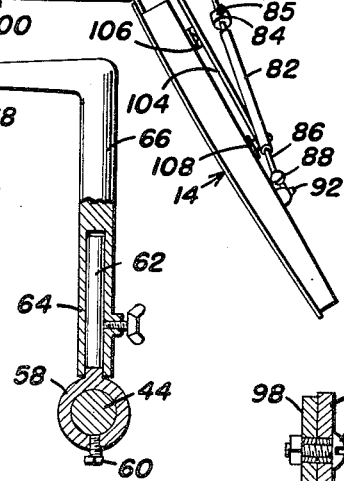
Figure 4 is a sectional and elevational view taken on the vertical line 4—4 of Figure 3, looking in the direction of the arrows.

With reference first to Figure 1, the phantom line showing at 8 denotes the rear seat and the corresponding showing at 10 denotes the front seat. The rear right forwardly opening door is denoted at 12 and the opposite left door by the numeral 14. Obviously, the motion transmitting and operating means is the same for each door, and for this reason the stated means will be described in the singular. It seems quite systematic to explain the nature of the invention by making reference first to the structure which is located in the forward portion of the vehicle paralleling the seat 10 of the driver. Reference is therefore made to Figure 3 wherein a first inverted U-shaped upright or post is denoted by the numeral 16, the same being fixed at 18 to the floor 20. This post or upright is provided at its top with bearing means 22. The duplicate upright or frame to the right is denoted by the numeral 26, and here again this is fixed, as at 28, to the floor 20. It is also provided at its upper end with bearing means 30. It is evident that the structural means in Figure 3 is a dual control arrangement, as will be later seen. On the other hand, it is desirable to point out that in case a single door arrangement is desired, a single unit is provided and a single rock shaft is journaled for rotation in the bearing means, as will be later described. In the dual arrangement here shown, a first rock shaft 32 is mounted for oscillation or rotation in the bearing 22 and it is provided at the left with an integral rocker arm 34. The right-hand end portion of the rock shaft is tubular and provided with diametrically opposite clutch notches 36—36. The second rock shaft is denoted by the numeral 38 and has a rocker arm 40 on its outer end, the inner end portion being hollow and provided with clutch pin notches 42 corresponding to those already referred to. A complemental third rock shaft bridges the space between the notched inner ends 36 and 42 and this is denoted by the numeral 44. It is provided with an adjustable clutch collar 45 having lugs 46 to engage in the notches 36, said collar being provided with a set screw 47. Additional clutch pin means 48 is provided on shaft 44 to optionally engage in the notches 42; whereby it is possible to shift or slide the end portion 50 to the left in the shaft 32, or to the right as shown at 52 in the shaft 38. The numeral 54 denotes collars for both posts, these collars surrounding their respective rock shafts and being held in place by set screws 56. The rock shaft 44 with its clutch elements and the coacting notches on the respective rock shafts 32 and 38 provide satisfactory clutch means, generally speaking. As best shown in Figure 4, another collar 58 is provided and this embraces the shaft 44 and is fastened thereto by a set screw 60, said collar being provided with an upstanding stud 62 fitting into the socket portion 64 on the lower end of the manually actuatable controller crank or lever 66. The handle portion is denoted at 68 and may be of any suitable design. Therefore, by way of this lever, the clutch elements 46 and 48 may be engaged with the respective rock shafts 32 or 38, in an obvious manner, so that it is possible by way of the lever and rock shaft 44 to rotate either of the rock shafts 32 and 38 in their respective bearings.

Figure 2:
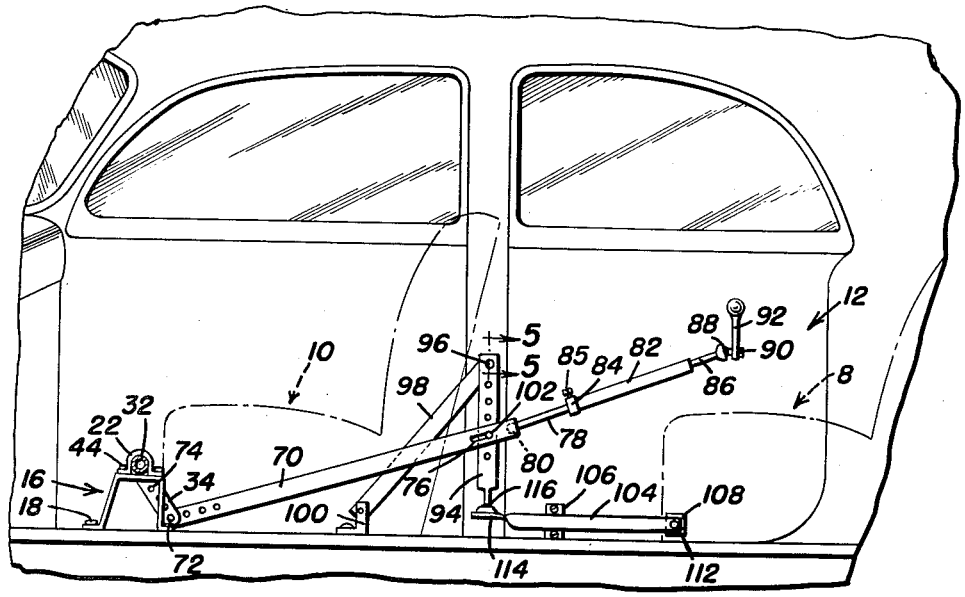
Figure 2 is a longitudinal sectional view with parts primarily in elevation showing the interior of an ordinary automobile and the operating means for one door, the section being on the plane of the line 2—2 of Figure 1, looking in the direction of the arrows.
Figure 6:
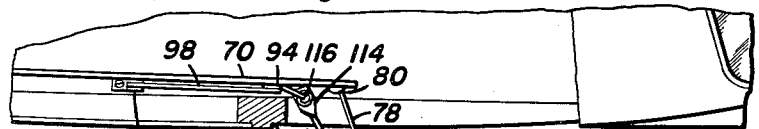
Figure 6 is a fragmentary plan view, with a portion in section, showing how the invention functions in swinging the left rear door to an open position.

The operating connection between the respective rocker arms 34 and 40 is the same in each instance, and therefore attention is invited now to this means, appearing best in Figure 2. Here there is an elongated, linearly straight link 70 pivoted at 72 to the rocker arm, the latter having adjusting holes 74 for the pivot to change the leverage if desired. This link forms part of linkage means which first unlatches the door and secondly swings the door to open position. There is an elongated slot 76 at the trailing end of the link, at which point there is a first rod 78 having ball and socket connection at 80 with said link. Rod 78 telescopes into a coupling sleeve 82 and it is provided with an adjustable stop collar 84 held by a set screw 85. A second rod 86 also fits telescopically into the rear end of the sleeve and the second rod is provided with ball and socket means 88 operatively connected at 90 with the trip handle 92 on the door which obviously serves to control the latch means (not shown). The motion-translating and thrust lever 94 is pivoted at 96 to the upper end of a diagonal brace and support member 98 which is fastened to the floor by a bracket 100. An adjustable operating pin 102 is carried by the intermediate portion of the lever and has delayed operating connection with the slot 76. The idea here is to utilize the linkage means as a push-pull arrangement for first operating the handle 92 and also unlatching the door. Then, the pin and slot means 76 and 102 come into play to actuate the lever 94 on its pivot 96.

Figure 7:
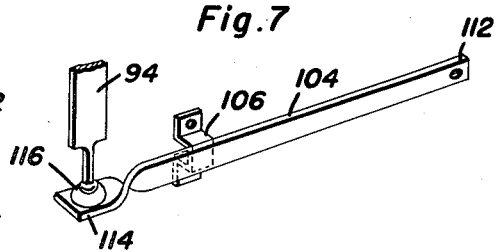
Figure 7 is a perspective view of a door adapter bar and a fragmentary portion of the complemental thrust or motion translating lever.
Figure 5:
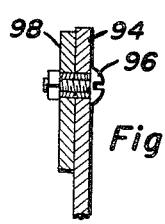
Figure 5 is a fragmentary enlarged section on the vertical line 5—5 of Figure 2, looking in the direction of the arrows.

There is an adapter bar 104 provided and this is secured to brackets 106 and 108 mounted on the lower interior portion of the door. The bar at the right, as best shown in Figure 7, is provided with an apertured end portion 112 suitably connected with the bracket 108. The opposite leading end of the bar is laterally twisted, as at 114, where it has suitable ball and socket articulating connection at 116 with the lower end portion of the lever 94. The lever 94 is normally perpendicular to 104, as shown in Figure 2, and it is located opposite the door post where the door is hinged to swing outwardly and then forwardly. The ball and socket joint connection is located in proper association with the line of swing of the door in order that the parts will be properly positioned and timed in operation.

In operation, the controller lever 66 is merely pushed forward by the driver and the rocker shaft which is then in use comes into play to control the linkage means. This results in moving the link 70 in a direction from left to right in Figure 2 and by way of the rods 78, 86 and the coupling 82 the door handle 92 is moved to unlatch the door. Obviously, the door has to be unlatched before the door opening means comes into play. The pin and slot arrangement provides for this, as is obvious, for when the left-hand end of the slot 76 engages the pin 102, the lever 94 is then brought into play and swings on its pivot 96 to provide the desired motion translating and thrust action on the bar 104 and the door swings open. The device also is employed by moving the lever in an opposite direction for closing the door. Finally, the door may be hand-operated, as usual.

It will be evident from the invention as disclosed in the drawings and also covered in the specification that the dual arrangement disclosed in Figure 3 provides for selective or optional operation of either the right rear door or the left rear door. Also the collar means 45 is adjustable on the rock shaft 44 for purposes of regulating the moment when the lugs 46 engage in the notches 36. Further, it will be evident from this arrangement that because of the telescoping connection between the several rock shafts the uprights or posts 16 and 26 may be set at desired distances apart to accommodate automobiles of varying widths. It is also important to keep in mind that a single control arrangement is clearly within the purview of this invention. Therefore, reference is made to Figure 8 wherein left and right posts or uprights are denoted by the numerals 120 and 122, respectively, having bearing brackets 124—124 held in place by collars 126. In this arrangement, the single rock shaft is denoted by the numeral 128 and the rocker arm is denoted at 130 and is joined at 72 with the aforementioned link 70. Here the controller lever is denoted by the numeral 132, the same having an eye or the like 134 surrounding the rock shaft and secured thereto by a set screw 136. It will be clear that the means shown in Figure 8 is an alternative arrangement of the means shown in Figure 3 and, as is obvious, the rock shaft 128 is arranged and constructed for single door control and operation, the right-hand door, for example.

In view of the foregoing description taken in conjunction with the accompanying drawings, it is believed that a clear understanding of the device will be quite apparent to those skilled in this art. A more detailed description is accordingly deemed unnecessary.

Minor changes in shape, size, materials and arrangement of parts may be resorted to in actual practice without departing from the spirit and scope of the invention as claimed.

Having described the invention, what is claimed as new is:

1. In combination, a vehicle body having an entrance and exit opening, an outwardly swinging door hingedly mounted on said body and normally closing said opening, a latch operating handle operatively mounted on the interior side of said door, a remote-controlled mechanical manually actuable device for progressively operating said latch operating handle and then forcibly swinging said door open comprising a vertical post fixedly mounted on said body, said post having bearing means, a horizontal rock shaft mounted for operation in said bearing means, said shaft having a rocker arm, manually actuatable means carried by said shaft for operating the shaft, push-pull linkage means embodying a rigid link disposed at approximate right angles to said shaft and adjustably hinged at one end to said rock arm, a first rod pivotally joined to the other end of said link, said link having a pin-slot adjacent said last named end, a coupling extensibly connected at one end with said other end of said rod, a second rod extensibly connected with the other end of said coupling and provided with self-adjusting means operatively connected with said latch operating handle, a motion transmitting lever having an adjustable pin operatively connected with said link by way of said pin-slot, said lever being at a lateral angle to said link, a support brace anchored on said body, said lever being adjustably pivoted at one end to said brace, fixture means embodying a bar rigidly attached to the interior side of said door and situated in a plane beneath said rods and coupling, and a ball and socket joint between the other end of said lever and an adjacent end of said bar.

2. In combination, a vehicle door having an interior latch-handle, a rigid push-pull link, manually actuatable remote control means operatively connected with and for imparting lengthwise movement to one end of said link, a first rod having flexible operating connection at one end with the other adjacent end of said link, a tubular rod coupling, a second rod, said rods having their adjacent ends fitting telescopically and slidingly in the respective end portions of said coupling, ball and socket jointing means on the other end of said second rod and operatively joined with said latch-handle, and a stop collar adjustably mounted on the intermediate portion of said first rod and cooperating with the adjacent end of said coupling.

3. The structure defined in claim 2 and the combination therewith of a horizontal bar, brackets securing said bar to a lower interior portion of said door, a complemental vertically disposed lever having ball and socket connection at one end with an adjacent end of said horizontal bar, a diagonal support-brace having means at one end whereby it may be securely and pivotally anchored on a relatively stationary part of the vehicle, means pivotally and adjustably connecting the other end of said support brace to the other end of said lever, and an operating connection between the intermediate portion of said lever and said push-pull link.

4. In combination, a vehicle body structure having a vertical side provided with an entrance and exit opening bordered along one vertical marginal edge by a hinging post, an outwardly swingable door having a vertical edge hinged for operation on said post and normally closing said opening, a latch operating handle operatively mounted on the upper interior side of said door, a horizontally disposed rigid bar fixedly secured to the interior of said door adjacent to the lower edge portion of the door, one end of said bar bridging the hinged edge of said door and terminating adjacent to said hinging post, an inclined support brace having upper and lower ends, the latter end being pivotally anchored on the floor of the body structure at a place spaced from the terminal end of said bar, a motion transmitting and operating lever having a lower end operatively joined to the terminal end of said bar, said lever being at a lateral angle to said bar and having an upper end pivotally connected with the upper end of said brace, a horizontal rock shaft mounted for angular rotation in bearing means supported on said floor, a manually actuatable controller lever operatively connected with said rock shaft, said rock shaft being disposed at an approximate right angle to said brace, a reciprocable push-pull link pivotally connected at one end to said rock shaft, the other end portion of said link overlapping and having adjustable and slidable operating connection with the intermediate portion of said motion transmitting lever, a first rod pivotally joined at one end to said other end portion of said link, a second rod pivotally and operatively connected at one end to said latch operating handle, a tubular coupling, the other ends of the respective rods telescoping into the respective adjacent ends of said coupling, and a stop collar adjustably mounted on said first rod and normally abutting the adjacent end of said coupling.

References Cited in the file of this patent

UNITED STATES PATENTS

| Number | Name | Date |
|---|---|---|
| 1,138,117 | Kariya | May 4, 1915 |
| 1,150,468 | Wemple | Aug. 17, 1915 |
| 1,177,471 | Barrett | Mar. 28, 1916 |
| 1,195,882 | Wear et al. | Aug. 22, 1916 |
| 1,211,308 | Gallup | Jan. 2, 1917 |
| 1,222,820 | Umpleby | Apr. 17, 1917 |
| 1,347,193 | Wade et al. | July 20, 1920 |
| 1,609,815 | Hainzigianis | Dec. 7, 1926 |
| 1,704,476 | Hennicke | Mar. 5, 1929 |
| 1,760,528 | Schantz | May 27, 1930 |
| 1,849,887 | Siggins et al. | Mar. 15, 1932 |
| 2,573,340 | Kleinhans | Oct. 30, 1951 |

FOREIGN PATENTS

| Number | Country | Date |
|---|---|---|
| 254,579 | Great Britain | July 8, 1926 |